(12) United States Patent
Shim et al.

(10) Patent No.: US 12,023,610 B2
(45) Date of Patent: Jul. 2, 2024

(54) SELF-CLEANING FILTER

(71) Applicant: Ahlstrom Oyj, Helsinki (FI)

(72) Inventors: Jesse Shim, Daegu Metropolitan (KR);
Kevin Kim, Daegu Metropolitan (KR);
Ryan Kwon, Daegu Metropolitan (KR);
Jayden Bae, Daegu Metropolitan (KR);
Patrick Yeo, Chuncheon-si (KR)

(73) Assignee: Ahlstrom Oyj, Helsinki (FI)

( * ) Notice: Subject to any disclaimer, the term of this patent is extended or adjusted under 35 U.S.C. 154(b) by 857 days.

(21) Appl. No.: 15/754,029

(22) PCT Filed: Aug. 22, 2016

(86) PCT No.: PCT/EP2016/069820
§ 371 (c)(1),
(2) Date: Feb. 21, 2018

(87) PCT Pub. No.: WO2017/032748
PCT Pub. Date: Mar. 2, 2017

(65) Prior Publication Data
US 2018/0243673 A1     Aug. 30, 2018

Related U.S. Application Data

(60) Provisional application No. 62/208,659, filed on Aug. 22, 2015.

(51) Int. Cl.
*B01D 35/00* (2006.01)
*B01D 39/16* (2006.01)
(Continued)

(52) U.S. Cl.
CPC ....... *B01D 35/005* (2013.01); *B01D 39/1623* (2013.01); *B01D 39/18* (2013.01);
(Continued)

(58) Field of Classification Search
None
See application file for complete search history.

(56) References Cited

U.S. PATENT DOCUMENTS

| | | | |
|---|---|---|---|
| 6,004,462 | A | 12/1999 | Yamada et al. |
| 2007/0074628 | A1 | 4/2007 | Jones et al. |

(Continued)

FOREIGN PATENT DOCUMENTS

| | | |
|---|---|---|
| CN | 101553660 A | 10/2009 |
| EP | 3 029 190 | 6/2016 |

(Continued)

OTHER PUBLICATIONS

Merriam-Webster. (n.d.). Coated definition meaning. Merriam-Webster. Retrieved Jul. 16, 2022, from https://www.merriam-webster.com/dictionary/coated (Year: 2022).*

(Continued)

*Primary Examiner* — Jason M Greene
*Assistant Examiner* — Eric J McCullough
(74) *Attorney, Agent, or Firm* — Sisson & Banyas, Attorneys at Law, LLC; Jeffrey J. Banyas

(57) ABSTRACT

A self-cleaning filtration media for use in hydrocarbon fluid filtration applications has a first layer on an upstream side and a second layer on downstream side of the self-cleaning filtration media. The first layer is composed of polyethersulfone nanofibers having a diameter of 50-1000 nm (0.05-1 micron) and a basis weight of at least 1 gsm. The second layer is a nonwoven substrate suitable for filtration applications. The self-cleaning filtration media exhibits a dust holding capacity of at least 6 mg/cm² and a filtration efficiency of greater than 90% for 4 micron particles when the self-cleaning filtration media is tested according to ISO 19438 for fuel filtration and according to ISO 4548-12 for oil filtration. When the second layer includes glass fibers, the
(Continued)

self-cleaning filtration media has a dust holding capacity of at least 10 mg/cm$^2$ and a filtration efficiency of greater than 99% for 4 micron particles when the self-cleaning filtration media is tested according to ISO 19438 for fuel filtration and according to ISO 4548-12 for oil filtration. The self-cleaning filtration media also has a fuel-water separation efficiency of at least 99% when a flat sheet is tested according to ISO 16332; and a lifetime of at least 90 minutes when tested with fuel and oil according to ISO 19438 and ISO 4548-12 using Medium Test Dust and a pressure drop of 70 kPa.

18 Claims, 2 Drawing Sheets

(51) Int. Cl.
    *B01D 39/18*     (2006.01)
    *B01D 39/20*     (2006.01)
    *B32B 5/02*     (2006.01)
    *B32B 5/26*     (2006.01)
    *C10G 31/09*     (2006.01)
    *D04H 1/4326*     (2012.01)
    *D04H 1/728*     (2012.01)
    *D04H 3/009*     (2012.01)
    *D04H 3/03*     (2012.01)

(52) U.S. Cl.
    CPC .......... *B01D 39/2017* (2013.01); *B32B 5/022* (2013.01); *B32B 5/26* (2013.01); *C10G 31/09* (2013.01); *D04H 1/4326* (2013.01); *D04H 1/728* (2013.01); *D04H 3/009* (2013.01); *D04H 3/03* (2013.01); *B01D 2239/025* (2013.01); *B01D 2239/0618* (2013.01); *B01D 2239/0631* (2013.01); *B01D 2239/0636* (2013.01); *B01D 2239/064* (2013.01); *B01D 2239/0654* (2013.01); *B01D 2239/0681* (2013.01); *B01D 2239/1216* (2013.01); *B01D 2239/1233* (2013.01); *B01D 2239/1291* (2013.01); *B32B 2250/02* (2013.01); *B32B 2250/20* (2013.01); *B32B 2262/02* (2013.01); *B32B 2262/062* (2013.01); *B32B 2262/101* (2013.01); *B32B 2262/14* (2013.01); *B32B 2307/726* (2013.01); *D10B 2331/061* (2013.01); *D10B 2505/04* (2013.01)

(56) References Cited

U.S. PATENT DOCUMENTS

| | | | |
|---|---|---|---|
| 2007/0163217 A1* | 7/2007 | Frey | B01D 39/1623 55/482 |
| 2008/0070463 A1* | 3/2008 | Arora | D04H 1/54 442/334 |
| 2008/0105626 A1* | 5/2008 | Jones | F02M 37/24 210/767 |
| 2010/0024370 A1 | 2/2010 | Jones et al. | |
| 2011/0079553 A1* | 4/2011 | Thomson | B01D 29/56 210/489 |
| 2011/0168647 A1 | 7/2011 | Wieczorek et al. | |
| 2013/0078882 A1 | 3/2013 | Yoo et al. | |
| 2014/0116945 A1* | 5/2014 | Kas | B01D 69/02 210/651 |

FOREIGN PATENT DOCUMENTS

| | | |
|---|---|---|
| GB | 1 522 280 A | 8/1978 |
| JP | 2013071456 A | 4/2013 |
| WO | 89/03716 A1 | 5/1989 |
| WO | 2008/057397 A1 | 5/2008 |
| WO | WO 2012/088205 | 6/2012 |
| WO | WO 2015/016449 | 2/2015 |

OTHER PUBLICATIONS

Aoki, Taichi, "Notice of Reasons for Rejection, Japanese Patent Application No. 2018-528095", Mar. 24, 2020, Japanese Patent Office.

Ning, Jia, "First Office Action, Chinese Application No. 201680048609.3", Nov. 6, 2019, pp. 1-9, State Intellectual Property Office, P.R. China, China.

International Search Report for PCT/EP2016/069820, mailed Oct. 21, 2016, 4 pages.

* cited by examiner

SELF-CLEANING FILTER

RELATED APPLICATIONS

This application is the U.S. national phase of International Application No. PCT/EP2016/069820 filed Aug. 22, 2016, which designated the U.S. and claims the benefit of U.S. Provisional Application No. 62/208,659 filed Aug. 22, 2015, the entire contents of each of which are hereby incorporated by reference herein.

TECHNICAL FIELD

This disclosure generally relates to self-cleaning filters and more particularly to self-cleaning filtration media and filter elements for hydrocarbon fluid filtration that exhibit high filtration efficiency, high dust holding capacity and a long operational lifetime.

BACKGROUND

Filter elements used for filtering hydrocarbon fluids, such as gasoline and diesel fuels, and hydraulic and lubrication oils, typically have a filtration media contained within a sealed enclosure. The enclosure has at least one intake port and at least one discharge port both in fluid communication with the filtration media such that hydrocarbon fluid flowing into the intake port(s) passes through the filtration media before exiting the enclosure through the discharge port(s). During the filtration process, solid particles are removed from the hydrocarbon fluid by forcing the fluid through the filtration media under pressure so that the solid particles are collected within the filtration media or on an upstream surface thereof, which can cause an undesirable drop in pressure across the filtration media. The upstream surface is the first surface the fluid contacts before flowing through the filtration media. To maintain pressure and flow through the filtration media, the collected solid particles therefore need to be removed, preferably without removing or replacing the filtration media and without interrupting fluid flow through the filtration media. Filtration media that achieve high efficiency in removing solid particles often include glass fibers.

Self-cleaning filters are a type of filter that automatically removes solid particles from a filtration media without the need for physically touching the filtration media. There are several types of self-cleaning filters that have been used for various types of filtration. Such filters typically utilize monitors and controllers that operate such things as movable suction means to remove solid particles from within the filter means or jet pulses of air to push solid particles off the upstream surface of the filtration media and then to flush the solid particles out of the filter. These types of self-cleaning filters are complex, costly and not effective for hydrocarbon fluid filtration applications.

Accordingly, there is a need for improved self-cleaning filtration media and filter elements for use in hydrocarbon fluid filtration applications that have high filtration efficiency, high dust holding capacity and a long operational lifetime.

SUMMARY

The foregoing purposes, as well as others, are achieved by a self-cleaning filtration media composed of a polyethersulfone (PES) nanofiber layer on an upstream side of a supporting layer, which is in face-to-face and fluid contact with the nanofiber layer. The supporting layer can be any material suitable for hydrocarbon fluid filtration applications including a nonwoven substrate of cellulose, synthetic fibers or a mixture thereof. A self-cleaning filtration media as disclosed herein is characterized by the following advantageous filtration properties: (i) Stiffness measured by TAPPI T489 om-92 of at least 7000 mg; (ii) Pore size measured by ASTM 316-03 of about 5 to about 30 µm; (iii) a dust holding capacity of at least 6 mg/cm$^2$, preferably at least 8 mg/cm$^2$ and a filtration efficiency of greater than 90%, preferably greater than 94%, for 4 micron particles when the self-cleaning filtration media is tested as a filter element according to ISO 19438 for fuel filtration and according to ISO 4548-12 for oil filtration, and more preferably, in embodiments including glass fibers, a dust holding capacity of at least 10 mg/cm$^2$ and a filtration efficiency of greater than 99% for 4 micron particles when the self-cleaning filtration media is tested as a filter element according to ISO 19438 for fuel filtration and according to ISO 4548-12 for oil filtration; (iv) a fuel-water separation efficiency of at least 99% when a flat sheet is tested according to ISO 16332; and (v) a lifetime of at least 1:30 hr (90 minutes), preferably, 1:50 hr (110 minutes) when tested with fuel according to ISO 19438 as a filter element using Medium Test Dust and a pressure drop of 70 kPa, and when tested with oil according to ISO 4548-12 as a filter element using Medium Test Dust and a pressure drop of 70 kPa.

In use, solid particles form a cake on an upstream surface of the self-cleaning filtration media, but low fouling surface characteristics of the PES nanofiber layer on the upstream surface of the self-cleaning filtration media cause the cake to slough off, or self-clean, the media. The self-cleaning filtration media shows higher initial and sustained filtration efficiency when tested with either fuel or oil, and the life time of the self-cleaning filtration media in both fuel and oil filtration is extended to about double the useful lifetime of a media without a nanofiber layer as disclosed herein.

In accordance with one aspect of the disclosure, a self-cleaning filtration media for use in hydrocarbon fluid filtration applications comprises a first layer on an upstream side of the self-cleaning filtration media and a second layer on a downstream side of the filtration media. The first layer comprises polyethersulfone nanofibers having a diameter of 50-1000 nm (0.05-1 micron), preferably 300-700 nm and more preferably 300-500 nm, which are electrospun directly onto the second layer to a basis weight of at least 1 gsm, preferably 1 to 5 gsm, and more preferably to 2-3 gsm. The second layer comprises a wet laid nonwoven composed of cellulose fibers and optionally glass microfibers.

In another aspect of the disclosure, a filter element for hydrocarbon fluid filtration comprises a self-cleaning filtration media as described above.

In yet another aspect of the disclosure, methods of filtering solid particles from hydrocarbon fluids are provided that include the steps of passing the hydrocarbon fluid through a filter element having a self-cleaning filtration media that comprises a first layer on an upstream side of the self-cleaning filtration media, the first layer comprising polyethersulfone nanofibers having a diameter of 50-1000 nm (0.05-1 micron) and a basis weight of greater than 1 gsm; and a second layer on a downstream side of the self-cleaning filtration media, the second layer comprising a nonwoven substrate; collecting particles in the hydrocarbon fluid as a cake on a surface of the first layer; and when sufficient particles have accumulated on the surface of the first layer, the cake sloughs off the surface of the first layer, such that the cake can be collected at a bottom of the filter element.

Other objects, features, and advantages of the various embodiments in the present disclosure will be explained in the following detailed description with reference to the appended drawings.

DETAILED DESCRIPTION

In the following detailed description and accompanying drawing FIGS. 1-2, various embodiments of a self-cleaning filttration media 10 are described with reference to hydrocarbon fluid filters to illustrate the general principles in the present disclosure. It will be recognized by one skilled in the art that the present disclosure may be practiced in other analogous applications or environments and/or with other analogous or equivalent variations of the illustrative embodiments. For example, the disclosed self-cleaning filtration media 10 may be used for separating water from oil and water from fuel. It should be noted that those methods, procedures, components, or functions which are commonly known to persons of ordinary skill in the field of the disclosure are not described in detail herein.

As used herein, the term "about" in the context of numerical values means that specific values may be modified by +/−10%. As regards endpoints of ranges, the modifier "about" preferably means that the lower endpoint may be reduced by 10% and the upper endpoint may be increased by 10%. It is also contemplated that each numerical value or range disclosed in this application can be absolute, i.e. that the modifier "about" can be deleted.

Figure 1:
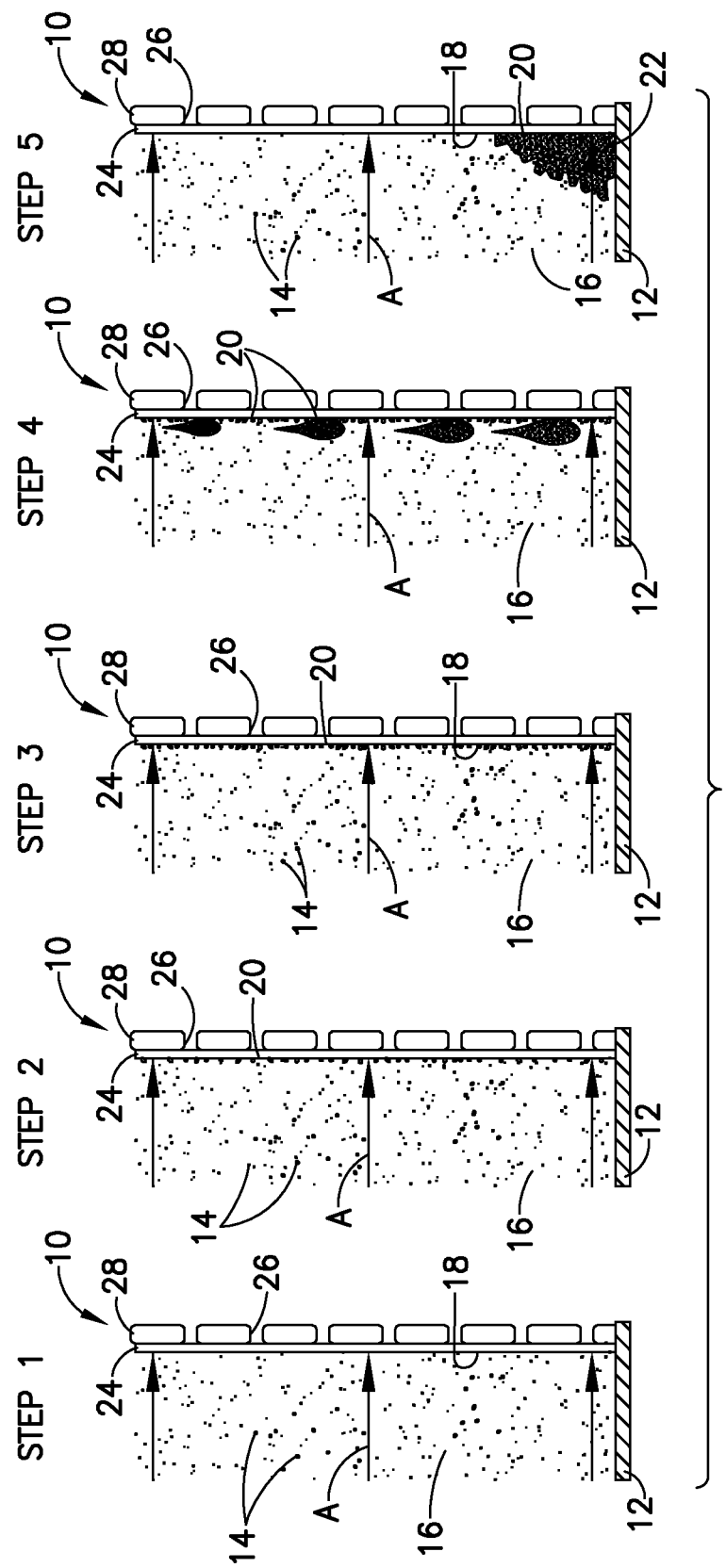
FIG. 1 is an illustration of a self-cleaning filter showing the self-cleaning effect in five steps.

Referring to FIG. 1, a self-cleaning filtration media 10 is shown positioned in a filter element 12, such as a hydrocarbon fluid filter, of the type having a filtration media contained within a sealed enclosure as described herein. The filter element 12 is shown in partial schematic views at various steps or stages of a filtration process. Step 1 on the left of FIG. 1 shows the self-cleaning filtration media 10 with particles 14 in a fluid 16, such as a hydrocarbon fluid, flowing in the direction of arrow A toward an upstream surface 18 of the self-cleaning filtration media 10. In Steps 2 and 3, the particles 14 gradually collect on the upstream surface 18 of the self-cleaning filtration media 10 and build-up to form a particle cake 20. In Steps 4 and 5, the particle cake 20 eventually reaches a sufficient weight where the particle cake 20 will slough off the upstream surface 18 of the self-cleaning filtration media 10, and gravitationally settle at a bottom area 22 of the filter element 12, where it can be removed from the filter element 12. This process of self-cleaning or surface filtering improves efficiency and extends the service life of the self-cleaning filtration media 10 and filter element 12.

The self-cleaning filtration media 10 comprises a nanofiber layer 24 composed of polyethersulfone (PES) nanofibers on an upstream side 26 of a supporting layer 28, which is in face-to-face and fluid contact with the nanofiber layer 24, and has a basis weight in the range of about 100 to 250 gsm. There is no need for any other layers on either side of the self-cleaning filtration media 10 to achieve the desired high filtration efficiency, high dust holding capacity and long operational lifetime properties. If the self-cleaning filtration media 10 needs additional structure for certain applications, an additional structural layer, such as a wire mesh or other structural material appropriate for filtration applications, may be positioned on a downstream surface of the supporting layer 28. In other applications, it may be desired to use a pre-filter to capture larger particles in a fluid 16 before the fluid 16 is filtered by the self-cleaning filtration media 10. Such a pre-filter should be positioned a distance upstream from (and not in contact with) the upstream surface 18 of the nanofiber layer 24 so as not to interfere with the self-cleaning features disclosed herein.

The self-cleaning filtration media 10 can be assembled into a filter element 12 in a flat configuration (as shown in the drawings) or the self-cleaning filtration media 10 can be pleated or corrugated prior to assembly in a filter element 12. Corrugations (used interchangeably with "grooves" or "grooving") are added to a (preferably resin saturated) media in the machine direction to provide support for pleated media in the finished filter element.

The supporting layer 28 can be any support material suitable for hydrocarbon fluid filtration applications that can be coated with nanofibers, and is preferably a nonwoven substrate of cellulose, synthetic fibers or a mixture thereof having a basis weight in the range of about 75 to 200 gsm, and more preferably in the range of about 100 to 175 gsm. As used herein, the term "nonwoven" means a manufactured sheet or web of directionally or randomly oriented fibers bonded by friction, cohesion or adhesion, and includes for example spunbond and wet laid nonwovens. The fibers may be staple or continuous or formed in situ and may be of natural or man-made materials. Cellulose fibers comprise naturally occurring cellulosic material such as Northern bleached softwood kraft pulp (NBSK), Southern bleached softwood kraft pulp (SBSK) and hardwood pulps, such as *Eucalyptus* pulp. Synthetic Fibers are manmade fibers including but not limited to thermoplastic fibers (such as polyethersulfone, polyester, PET, polyamide, polyvinylidene fluoride), glass fibers and regenerated cellulose. Preferably, synthetic fibers are dimensionally stable at high temperatures, 150° C. or higher.

In preferred embodiments, the supporting layer 28 is a nonwoven substrate that is wet laid using conventional papermaking equipment, and comprises about 80-100% by weight of cellulose fibers and 0-20% by weight of glass fibers based on the total weight of the supporting layer 28. In some embodiments particularly suited for filtering gasoline, the supporting layer 28 comprises substantially no (0%) glass fibers, and in other embodiments particularly suited for filtering diesel fuel, the supporting layer 28 comprises up to 20% by weight of glass fibers, preferably 15-20%. The cellulose fibers may include about 25-75% by weight of softwood fibers and/or about 75-25% by weight of hardwood fibers based on the total weigh of the supporting layer 28. Exemplary softwood fibers include fibers obtained from mercerized southern pine such as mercerized southern pine fibers or "HPZ fibers" or southern bleached softwood kraft such as Brunswick pine. Exemplary hardwood fibers include fibers obtained from *Eucalyptus*.

A resin is applied to about 10-25%, and more preferably to about 15-20%, of the weight of the supporting layer 28 and the solvent is removed. Resins useful in various embodiments of the self-cleaning filtration media 10 disclosed herein include phenolic, acrylic and epoxy resins. Resins can be applied or coated onto one side or both sides of the supporting layer 28 by any means know in the art. The physical properties of the self-cleaning filtration media 10 can be evaluated after it has been saturated with a resin and dried (SD) as well as after it has been saturated with a resin, dried and cured (SDC). The step of drying removes the solvent without crosslinking the resin.

The nanofiber layer 24 comprises nanofibers electrospun directly onto the upstream side 26 of the supporting layer 28 to a weight of at least 0.5 gsm, preferably at least 1.0 gsm, more preferably to a weight in the ranges of 1 to 5 gsm, 1.5 to 3.0 gsm, and more preferably to 2 to 3 gsm. In embodiments where the self-cleaning filtration media 10 is corrugated, the supporting layer 28 of the self-cleaning filtration media 10 is corrugated prior to directly spinning the nanofiber layer 24 onto the corrugated supporting layer 28. Nanofibers are fibers having a diameter less than 1 micrometer (μm) or 1000 nanometers (nm), particularly 50-1000 nm (0.05-1.0 μm). The nanofibers in the self-cleaning filtration media 10 preferably comprise polyethersulfone (PES) having a diameter of 300-700 nm, and more preferably a diameter of 300-500 nm. The composition of nanofiber-forming electrospun material preferably includes polyethersulfone and an adhesive that can be either coextruded as a miscible compound with the polyethersulfone, i.e. either blended together prior to electrospinning, or electrospun simultaneously such that the adhesive is applied at the same time the nanofibers are being formed. The adhesive is a chemical compound that assists in holding the nanofibers of the nanofiber layer 24 to the supporting layer 28, such as diisocyanate. The adhesive is used in amount of about 1 to 5% by weight and the PES is used in an amount of about 95 to about 99% by weight based on the total weight of the composition of nanofiber-forming electrospun material. In preferred embodiments of the self-cleaning filtration media, no additional adhesive is required to facilitate adhesion of the nanofiber layer 24 to the supporting layer 28. In other embodiments, particularly those where the basis weight of the nanofiber layer 24 is greater than 5 gsm, an additional adhesive may be applied directly onto the supporting layer 28.

Polyethersulfone is an amber-colored transparent amorphous thermoplastic that possesses sulfur as a main component. It has great dimensional stability and good mechanical properties over a range of temperatures from −50° C. to 220° C., thus it can withstand pleating processes which typically heat a substrate to 180-190° C. Polyethersulfone also has good chemical resistance so that it can be used in applications that will be exposed to solvents and chemicals like gasoline, petroleum, alcohols, engine and transmission oils, and provides the self-cleaning filtration media 10 with an upstream surface 18 having a hydrophobic nature that is useful for water removal in fuel/water and oil/water separation applications, as it allows water to bead up more on the upstream surface 18.

Figure 2:
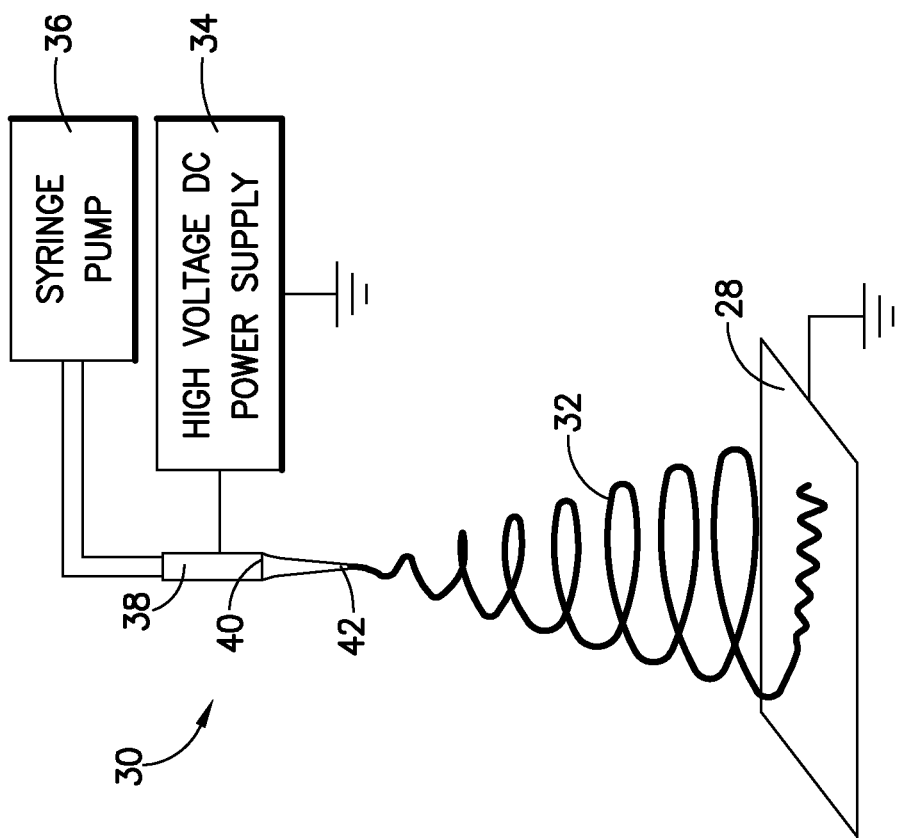
FIG. 2 is an illustration of equipment for electrospinning a nanofiber layer onto a substrate.

FIG. 2 shows a schematic diagram of an apparatus 30 for nozzle type solvent electro-spinning of nanofibers 32 directly onto a supporting layer 28 to form the self-cleaning filtration media 10 disclosed herein. In the electro-spinning process, a high voltage is applied from a high voltage DC power supply 34 to a polymer in solution to create nanofibers 32 and the nanofiber layer 24. A pump 36 loads the polymer solution into a spinneret 38, and high voltage is applied to the polymer solution within the spinneret 38. Charge builds up on a droplet of solution that is suspended at the tip 40 of the spinneret 38. As the charge overcomes the surface tension of the solution, the droplet elongates and forms a Taylor cone 42. Finally, the solution exits out of the tip of the Taylor cone 42 as a jet, which travels through the air to the supporting layer 28, which has been electrically grounded. While traveling, the solvent evaporates, leaving nanofibers 32. The nanofibers 32 have a high length to diameter ratio, which provides a very large surface area per unit mass. Nanofibers 32 may be produced at a speed of about 15-20 meters per minute using the foregoing electrospinning process at a production width of about 1.7 meters.

A self-cleaning filtration media 10 as disclosed herein is characterized by the following advantageous filtration properties: (i) Stiffness measured by TAPPI T489 om-92 of at least 7000 mg; (ii) Pore size measured by ASTM 316-03 of about 5 to about 30 μm; (iii) a dust holding capacity of at least 6 mg/cm$^2$, preferably at least 8 mg/cm$^2$ and a filtration efficiency of greater than 90%, preferably greater than 94%, for 4 micron particles when the self-cleaning filtration media is tested as a filter element according to ISO 19438 for fuel filtration and according to ISO 4548-12 for oil filtration, and more preferably, in embodiments including glass fibers, a dust holding capacity of at least 10 mg/cm$^2$ and a filtration efficiency of greater than 99% for 4 micron particles when the self-cleaning filtration media is tested as a filter element according to ISO 19438 for fuel filtration and according to ISO 4548-12 for oil filtration; (iv) a fuel-water separation efficiency of at least 99% when a flat sheet is tested according to ISO 16332; and (v) a lifetime of at least 1:30 hr (90 minutes), preferably, 1:50 hr (110 minutes) when tested with fuel according to ISO 19438 using Medium Test Dust and a pressure drop of 70 kPa, and when tested with oil according to ISO 4548-12 using Medium Test Dust and a pressure drop of 70 kPa.

EXAMPLES

The following comparative examples illustrative the improved properties of self-cleaning filtration media 10. Examples 1, 2A and 2B are formulated without any glass fibers and Examples 3-6 are formulated with glass fibers.

Example 1

The supporting layer 28 is a 100% cellulosic wet laid nonwoven comprising 28.5% Northern Bleached Softwood Kraft (NBSK) and 71.4% *Eucalyptus* pulp having a basis weight of 105 gsm, a flat sheet caliper of 0.36 mm (4 mils). The supporting layer 28 is saturated with 17% phenolic resin (such as KC 2540R from Kangnam Chemical Co. Ltd) and 0.2% wet strength additive such that the basis weight (SD) of the saturated supporting layer 28 is about 128 gsm and basis weight (SDC) is about 123 gsm. The weight of the fibers in this supporting layer 28 is 83% of the weight of the supporting layer 28. In this example, there is no nanofiber layer 24.

Examples 2A and 2B

In both of these examples, the supporting layer 28 is the same as in Example 1, but these exemplary self-cleaning filtration media 10 have a nanofiber layer 24 of polyethersulfone (PES) nanofibers electrospun directly onto the supporting layer 28. The PES nanofiber layer 24 has a basis weight of about 2.5 gsm, so that the self-cleaning filtration media 10 has a total basis weight (SD) of 130 gsm and a basis weight (SDC) of 125 gsm. The nanofibers in Example 2A have a diameter in the range of about 500-700 nm and the nanofibers in Example 2B have a diameter in the range of about 300-500 nm. Thus, the flat sheet caliper of Example 2A is about 0.38 mm (15 mils) and the flat sheet caliper of Example 2B is about 0.39 mm. The weight of the fibers in these self-cleaning filtration media 10 is 83% of the weight of the self-cleaning filtration media 10. There is no additional adhesive between the nanofiber layer 24 and the supporting layer 28.

Example 3

The supporting layer 28 is a wet laid nonwoven comprising 43% NBSK pulp, 12.4% Southern Bleach Softwood Kraft (SBSK) pulp, 29% mixed hardwood pulp (57% Oak/43% Acacia) and 15.6% glass fiber (such as C-04-Fi from Lauscha), and having a basis weight of 155 gsm a flat sheet caliper of 0.58 mm (23 mils). The supporting layer 28 is saturated with 16% phenolic resin (such as KC 2540R from Kangnam Chemical Co. Ltd), an $H_2O$ repellent in the amount of 2.3% of the weight of the resin and 0.4% of the weight of the self-cleaning filtration media 10, and a wet strength additive in the amount of 3% of the weight of the supporting layer 28. The basis weight of the saturated dried (SD) supporting layer 28 is 188 gsm and of the saturated dried and cured (SDC) supporting layer 28 is 180 gsm. The weight of the fibers in this supporting layer 28 is about 84.4% of the weight of the supporting layer 28. In this example, there is no nanofiber layer 24.

Example 4

The supporting layer 28 in this example is the same as in Example 3, but has a nanofiber layer 28 of polyethersulfone (PES) nanofibers electrospun directly onto the supporting layer 28. The nanofibers in the nanofiber layer 24 have a diameter in the range of 500-700 nm. The PES nanofiber layer 24 has a basis weight of about 2.5 gsm, so that the self-cleaning filtration media 10 of this example has a total basis weight (SD) of 190 gsm, a total basis weight (SDC) of 182 gsm and a caliper of 0.58 mm (23 mils). The weight of the fibers in this self-cleaning filtration media 10 is about 84.4% of the weight of the self-cleaning filtration media 10. There is no additional adhesive between the nanofiber layer 24 and the supporting layer 28 in this example.

Example 5

The supporting layer 28 in this example is a wet laid nonwoven comprising 34.4% mixed softwood pulp, 50% mixed hardwood pulp and 15.6% glass fiber (such as C-04-Fi from Lauscha), and having a basis weight of 168 gsm and a flat sheet caliper of 0.56 mm. The supporting layer 28 is saturated with 18% phenolic resin (such as KC 2540R from Kangnam Chemical Co. Ltd), an $H_2O$ repellent in the amount of 2.3% of the weight of the resin, and a wet strength additive in the amount of 3% of the weight of the supporting layer 28. The basis weight of the saturated dried (SD) supporting layer 28 is 208 gsm and of the saturated dried and cured (SDC) supporting layer 28 is 200 gsm. The weight of the fibers in this supporting layer 28 is about 84.4% of the weight of the supporting layer 28. In this example, there is no nanofiber layer 24.

Example 6

The supporting layer 28 in this example is the same as in Example 5, but has a nanofiber layer 24 of polyethersulfone (PES) nanofibers electrospun directly onto the supporting layer 28. The nanofibers in the nanofiber layer have a diameter in the range of 300-500 nm. The PES nanofiber layer 24 has a basis weight of about 2.5 gsm, so that the self-cleaning filtration media 10 of this example has a total basis weight (SD) of 210 gsm, a total basis weight (SDC) of 201 gsm and a caliper of 0.54 mm. The weight of the fibers in this self-cleaning filtration media 10 is about 84.4% of the weight of the self-cleaning filtration media 10. There is no additional adhesive between the nanofiber layer 24 and the supporting layer 28 in this example.

Tables I and II show the properties of the exemplary self-cleaning filtration media 10 (Examples 2A, 2B, 4 and 6) compared to supporting layers 28 without an upstream nanofiber layer 24 (Examples 1, 3 and 5):

TABLE I

| Properties | Test Method | Unit | | Ex. 1 | Ex. 2A | Ex. 2B |
|---|---|---|---|---|---|---|
| Nanofiber Diameter | | nm | | | 500-700 | 300-500 |
| Resin Content | | % | | 17% | 17% | 17% |
| Mass per unit area | TAPPI T410 om-02 | g/m² | SD | 128 | 130 | 130 |
| | | | SDC | 123 | 125 | 125 |
| Thickness (Caliper) | TAPPI T411 om-05 | mm | Corrugated Media | 0.69 | 0.66 | 0.65 |
| | | | Flat Sheet | 0.36 | 0.38 | 0.39 |
| Corrugation Depth | TAPPI T411 om-05 | mm | | 0.33 | 0.28 | 0.26 |
| Air permeability | TAPPI T251 cm-85 | cfm/sf | — | 16 | 13 | 12.4 |
| Burst Strength | TAAPI T403 om-22 | kg/cm² | SD | 1.7 | 1.7 | 1.9 |
| Stiffness | TAPPI T489 om-92 | mg | SD | 4800 | 4900 | 4830 |
| | | | SDC | | | |
| Pore Size | ASTM 316-03 | µm | Max | 39 | 32 | 36 |
| | | | Mean | 28 | 26 | 27 |
| DHC (Fuel) ISO 19438 | ISO 19438 | mg/cm² | Filter Element | 3.75 | 8.96 | 9.23 |
| Life Time (Fuel) ISO 19438 | ISO 19438 | min | Filter Element | 1:18 | 2:48 | 2:53 |
| Efficiency @ 4 µm (Fuel) | ISO 19438 | % | Filter Element | 46.4 | 94.8 | 96.9 |
| DHC (Oil) ISO 4548-12 | ISO 4548-12 | mg/cm² | Filter Element | 3.69 | 8.89 | 9.22 |
| Life Time (Oil) ISO 4548-12 | ISO 4548-12 | min | Filter Element | 1:18 | 2:48 | 2:52 |

TABLE I-continued

| Properties | Test Method | Unit | | Ex. 1 | Ex. 2A | Ex. 2B |
|---|---|---|---|---|---|---|
| Efficiency @ 4 μm (Oil) | ISO 4548-12 | % | Filter Element | 42.9 | 94.6 | 96.5 |
| Fuel Water Separation Efficiency | ISO 16332 | % | Sheet | 79.5 | 99.9 | 99.9 |

TABLE II

| Properties | Test Method | Unit | | Ex. 3 | Ex. 4 | Ex. 5 | Ex. 6 |
|---|---|---|---|---|---|---|---|
| Nanofiber Diameter | | nm | | | 500-700 | | 300-500 |
| Resin Content | | % | | 16% | 16% | 18% | 18% |
| Mass per unit area | TAPPI T410 om-02 | g/m$^2$ | SD | 188 | 190 | 208 | 210 |
| | | | SDC | 180 | 182 | 200 | 201 |
| Thickness (Caliper) | TAPPI T411 om-05 | mm | Corrugated Media | 0.73 | 0.72 | 0.83 | 0.71 |
| | | | Flat Sheet | 0.58 | 0.58 | 0.56 | 0.54 |
| Corrugation Depth | TAPPI T411 om-05 | mm | | 0.15 | 0.14 | 0.27 | 0.17 |
| Air permeability | TAPPI T251 cm-85 | cfm/sf | | — | 2.4 | 2.16 | 3.2 | 2.1 |
| Burst Strength | TAAPI T403 om-22 | kg$_f$/cm$^2$ | SD | 1.35 | 1.3 | 1.6 | 1.8 |
| Stiffness | TAPPI T489 om-92 | mg | SD | 5779 | 5820 | 5512 | 3730 |
| | | | SDC | 8979 | 9012 | 8446 | 10310 |
| Pore Size | ASTM 316-03 | μm | Max | 23 | 22.7 | 25 | 21 |
| | | | Mean | 15 | 13.7 | 14 | 11 |
| DHC (Fuel) ISO 19438 | ISO 19438 | mg/cm$^2$ | Filter Element | 6.27 | 10.59 | 3.51 | 11.97 |
| Life Time (Fuel) ISO 19438 | ISO 19438 | min | Filter Element | 1:11 | 1:58 | 0:41 | 2:13 |
| Efficiency @ 4 μm (Fuel) | ISO 19438 | % | Filter Element | 99.8 | 99.9 | 98.5 | 99.9 |
| DHC (Oil) ISO 4548-12 | ISO 4548-12 | mg/cm$^2$ | Filter Element | 6.21 | 10.55 | 3.51 | 11.84 |
| Life Time (Oil) ISO 4548-12 | ISO 4548-12 | min | Filter Element | 1:10 | 1:57 | 0:41 | 2:11 |
| Efficiency @ 4 μm (Oil) | ISO 4548-12 | % | Filter Element | 99.8 | 99.9 | 98.5 | 99.6 |
| Fuel Water Separation Efficiency | ISO 16332 | % | Sheet | 98 | 99.8 | 95.4 | 99.3 |

Test Methods:

The properties set forth in TABLES I and II were determined in accordance with the following test methods.

Basis Weight: The basis weight was measured according to TAPPI Standard T 410 om-02 and reported in grams per square meter (gsm).

Caliper or Thickness: The caliper or thickness of the self-cleaning filtration media 10 is determined according to TAPPI Standard T 411 om-05 using a Thwing Albert 89-100 Thickness Tester.

Corrugation Depth is the difference between the caliper of the flat sheet of a media and the thickness of the sheet after corrugating the media.

Air Permeability: The air permeability, or "air perm", of the self-cleaning filtration media 10 is measured according to TAPPI Standard T 251 cm-85 ("Air Permeability of Porous Paper, Fabric and Pulp Handsheets) with 0.5 inch (2.7 mm) water differential using a Textest AG (model FX3300) and reported as the rate of the flow of air in cubic feet per square foot of sample area per minute (cfm/sf), sometimes referred to as cfm. Air Perm may also be referred to as porosity, Frazier or Textest.

Burst Strength: The wet and dry burst strength is measured according to TAPPI Standard T 403 om-22 ("Bursting Strength of Paper") and reported in kgf/cm$^2$.

Stiffness of the self-cleaning filtration media 10 was determined according to TAPPI T 489 om-92 using a Gurley bending resistance tester MOD 4171D (Gurley Precision Instruments).

Pore Size: The size of the pores in the self-cleaning filtration media 10 was determined using a bubble point method according to ASTM 316-03 (2011) utilizing a Porometer G3 Series (Quantachrome Instruments) and reported in microns (μm).

Dust Holding Capacity/Efficiency: Using a Multipass test bench (Bonavista B23-04) system according to ISO 19438 for fuel filtration, the DHC and particle removal efficiency of the self-cleaning filtration media 10 was obtained. ISO 19438 specifies a multi-pass filtration test, with continuous contaminant injection and using the on-line particle counting method, for evaluating the performance of fuel filters for internal combustion engines submitted to a constant flow rate of test liquid. The test procedure determines the contaminant capacity of a filter, its particulate removal characteristics and differential pressure. Following ISO 4548-12 for lube oil filtration using a Multipass system, the DHC and particle removal efficiency for hydraulic oil was determined for the self-cleaning filtration media 10. ISO 4548-12 establishes standard test procedures for measuring the performance of full-flow lubricating oil filters for internal combustion engines, and specifies a multi-pass filtration test with continuous contaminant injection and using the online particle counting method for evaluating the performance of full-flow lubricating oil filters for internal combustion engines. The test procedure determines the contaminant capacity of a filter, its particulate removal characteristics and differential pressure. For both fuel and oil particulate removal, the self-cleaning filtration media 10 is tested as a filter element with a test flow of 2 L/min, particle injection flow of 250 mL/min, BUGL (Basic Upstream Gravimetric Level) of 25 mg/L (ISO Medium Test Dust), a pressure drop of 70 kPa and a filter test area of 1003 cm$^2$ (58 pleats×2, height of 13 mm and width of 66.5 mm).

Fuel Filter Water Separation Efficiency was analyzed using a Multipass water separation test bench (GMN FWTB-20-6) system according to ISO 16332 and reported as the average water separation efficiency over 90 minutes. ISO/TS 16332:2006 specifies a fuel/water separation test with continuous water injection, using an offline water concentration measuring method, for evaluating the ability of a fuel filter to separate either finely or coarsely dispersed undissolved water out of fuel. This was done for the flat sheet at 0.52 L/min with water droplets (D50 of 60 μm). The self-cleaning filtration media 10 shows improved particle filtration and a longer useful lifetime than untreated media for hydrocarbon fluid filtration applications. The self-cleaning filtration media 10 also shows a substantial increase in the dust holding capacity as compared to untreated media, and exhibits good fuel water separation for fuel systems. The self-cleaning filtration media 10 with a PES nanofiber layer 24 electro-spun directly onto a support layer 28 with no glass fibers (Exs. 2A and 2B) has a similar efficiency to a filtration media that contains glass fiber and a dust holding capacity that is about double compared to the dust holding capacity of the support layer 28 by itself.

Many other modifications and variations may of course be devised given the above description of various embodiments for implementing the principles in the present disclosure. For example, and without limitation, modifications may be made to the resin, the basis weight and composition of the supporting layer 28, and the amount of resin added onto the supporting layer 28. It is intended that all such modifications and variations be considered as within the spirit and scope of this disclosure, as defined in the following claims.

The invention claimed is:

1. A filter element comprising a self-cleaning filtration media for use in hydrocarbon fluid filtration applications, wherein the self-cleaning filtration media comprises:
a first layer on an upstream side of the self-cleaning filtration media, the first layer comprising polyethersulfone nanofibers having a diameter of 50-1000 nm (0.05-1 micron) and a basis weight of greater than 1 gsm;
a second layer on a downstream side of the self-cleaning filtration media, the second layer comprising a nonwoven substrate;
the self-cleaning filtration media having a dust holding capacity of at least 6 mg/cm$^2$, an oil filtration efficiency of greater than 90% for 4 micron particles when the self-cleaning filtration media is tested according to ISO 4548-12 for oil filtration, and a fuel filtration efficiency of greater than 90% for 4 micron particles when the self-cleaning filtration media is tested according to ISO 19438 for fuel filtration,
wherein the first layer is coated onto the second layer, and an upstream surface of the filter element is a surface of the first layer.

2. The filter element of claim 1, wherein the first layer comprises nanofibers having a diameter of 300-700 nm.

3. The filter element of claim 2, wherein the first layer comprises nanofibers having a diameter of 300-500 nm.

4. The filter element of claim 1, wherein the first layer has a basis weight of 1 to 5 gsm.

5. The filter element of claim 4, wherein the first layer has a basis weight of 2 to 3 gsm.

6. The filter element of claim 1, wherein the nanofibers of the first layer are electrospun onto the second layer.

7. The filter element of claim 1, wherein the nanofibers comprise an electrospun blend of polyethersulfone and an adhesive.

8. The filter element of claim 7, wherein the adhesive is blended with the polyethersulfone in an amount of 1%-5% prior to electrospinning the first layer.

9. The filter element of claim 1, wherein the nonwoven substrate of the second layer is a wet laid nonwoven comprising up to 20% by weight glass microfibers.

10. The filter element of claim 9, wherein the wet laid nonwoven further comprises a resin applied to a weight of 10-25% of the weight of the wet laid nonwoven.

11. The filter element of claim 9, wherein the second layer comprises 3-20% glass microfibers.

12. The filter element of claim 11, wherein the self-cleaning filtration media has a fuel filtration efficiency of greater than 99% for 4 micron particles when a filter element is tested according to ISO 19438 and/or an oil filtration efficiency of greater than 99% for 4 micron particles when a filter element is tested according to ISO 4548-12.

13. The filter element of claim 1, wherein the self-cleaning filtration media has a fuel-water separation efficiency of at least 99% when a flat sheet of the self-cleaning filtration media is tested according to ISO 16332.

14. The filter element of claim 1, wherein the self-cleaning filtration media has lifetime of at least 90 minutes when tested with fuel according to ISO 19438 and when tested with oil according to ISO 4548-12 using Medium Test Dust and a pressure drop of 70 kPa.

15. The filter element of claim 1, which is chemically resistant to gasoline, petroleum, alcohols, engine and transmission oil.

16. A method of filtering particles from a hydrocarbon fluid, comprising the steps of:
passing the hydrocarbon fluid through the filter element of claim 1;
collecting particles in the hydrocarbon fluid as a cake on a surface of the first layer such that when sufficient particles have accumulated on the surface of the first layer, the cake sloughs off the surface of the first layer, such that the cake can be collected at a bottom of the filter element.

17. The method of claim 16, wherein the first layer of the self-cleaning filtration media is configured with nanofibers having a diameter of 300-700 nm and a basis weight of 1 to 5 gsm.

18. The filter element of claim 1, wherein the nonwoven substrate of the second layer is free of glass fibers.

* * * * *